(12) United States Patent
Andersen et al.

(10) Patent No.: US 6,582,196 B1
(45) Date of Patent: Jun. 24, 2003

(54) WINDMILL ROTOR AND WIND BLADES THEREFOR

(75) Inventors: Søren Andersen, Lunderskov (DK); Henrik Albertsen, Lunderskov (DK); Peter Grabau, Kolding (DK)

(73) Assignee: LM Glassfiber A/S, Lunderskov (DK)

( * ) Notice: Subject to any disclaimer, the term of this patent is extended or adjusted under 35 U.S.C. 154(b) by 0 days.

(21) Appl. No.: 09/486,700

(22) PCT Filed: Sep. 4, 1998

(86) PCT No.: PCT/DK98/00378
§ 371 (c)(1),
(2), (4) Date: Mar. 3, 2000

(87) PCT Pub. No.: WO99/14490
PCT Pub. Date: Mar. 25, 1999

(30) Foreign Application Priority Data

Sep. 4, 1997  (DK) .............................................. 1009/97

(51) Int. Cl.$^7$ ................................................. F03D 1/06
(52) U.S. Cl. ...................... 416/202; 416/228; 416/238; 416/240; 415/4.3; 415/4.5
(58) Field of Search ............................ 416/10, 11, 228, 416/235, 237, 238, 9, 202, 240, 223 R; 415/4.3, 4.5, 908

(56) References Cited

U.S. PATENT DOCUMENTS

| | | | | |
|---|---|---|---|---|
| 217,067 | A | * 7/1879 | Cowdery ...................... | 416/10 |
| 1,929,690 | A | * 10/1933 | Huntman ...................... | 416/238 |
| 2,451,106 | A | * 10/1948 | Martin ........................ | 416/238 |
| 4,180,369 | A | * 12/1979 | Ottosen ....................... | 415/908 |
| 4,431,375 | A | * 2/1984 | Carter, Jr. et al. ............. | 416/11 |
| 4,550,259 | A |   10/1985 | Bertels | |
| 4,648,801 | A | * 3/1987 | Wilson ....................... | 415/908 |
| 5,219,454 | A | * 6/1993 | Class ..................... | 416/204 R |

FOREIGN PATENT DOCUMENTS

| | | | | |
|---|---|---|---|---|
| DE | 3047501 A1 | * 7/1982 | ................. | 416/238 |
| DE | 3130257 A1 |   2/1983 | | |
| DE | 197 12 034 A1 |   9/1998 | | |
| DE | 197 19 221 C1 |   10/1998 | | |
| DE | 198 07 193 C1 |   5/1999 | | |
| DE | 198 15 208 A1 |   10/1999 | | |
| FR | 943749 A | * 3/1949 | ................. | 416/10 |

OTHER PUBLICATIONS

Wieksystemen 1982, Kluver Technische Boeken B.V., Deventer–Antwerpen, 1$^{st}$ Edition 1982, p. 22 and 24.
Nutzung Der Windenergie: Ein Informationspaket von Siegfried Heier, Verlag Tüv Rheinland 1995.
Møllevinger, Mollen, Mar.–Apr. 1991.
Molenecho's, May–Jun. 1984, Belgian Periodical.
G.J. Pouw, *Wieksystemen voor polder– en industrimolens*, Kluwer Technische Boeken.
*LM 43.8 P on its way to market*, LM Newsletter, p. 3.
*Berichte aus dem Fachbereich Flugzeug– und Triebwerkbau*, Ariβ ausgewählter Beiträge zur Windenergienutzung, Willi Hallmann, Fachhoshschule Aachen FH–Texte, 43.
E.P. Popov, *Mechanics of Materials*, Second Edition.
*Analysis of Maximum Deflection*, DeHoop (anno 1817), pp. 1–3.

\* cited by examiner

Primary Examiner—Christopher Verdier

(57) ABSTRACT

A windmill rotor of the front-runner type and airfoil type wind blades therefor in which the blade tips have a longitudinally forwardly curved configuration. The curvature solves the problem of inward flexure of the blade in strong wind conditions, without requiring modification of the manner in which the rotor as a whole is mounted in order to avoid having the blade strike the windmill tower under such strong wind conditions.

6 Claims, 1 Drawing Sheet

WINDMILL ROTOR AND WIND BLADES THEREFOR

Figure 1:
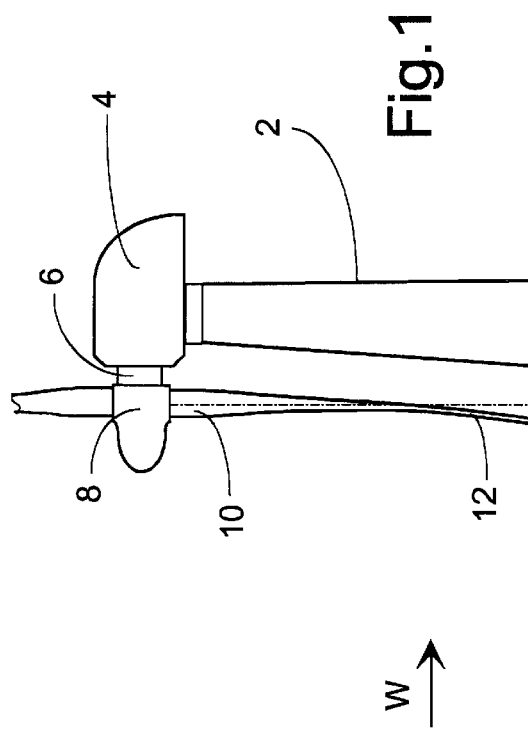

The present invention concerns a windmill with a rotor of the usual type which is normally configured with three blades extending from a blade hub on the main shaft of the windmill housing. The mill housing is disposed in a rotatable manner on the top of the mill tower, and with so-called front-runners the system is arranged so that the rotation of the mill housing is controlled to maintain the blade rotor facing towards the wind, i.e. so that the wind first hits the rotor and thereafter the tower.

The windmill blades are predominantly configured as steel constructions where efforts are made to keep these both as light and as rigid as practically possible, the result being a compromise in that the blades are provided with considerable rigidity, but at the same time also a certain elastic resilience which will naturally manifest itself with blades of greater lengths, e.g. 15–30 m. The wind pressure in against the blade rotor, where the blades turn their broad sides against the wind, will thus give rise to an elastic rearwards flexing of the blades. With rotating blades, this situation is alleviated to a considerable degree by two different circumstances, i.e. partly that the centrifugal force which simultaneously arises on the blades seeks to straighten out the blades, and partly that the blades, as a consequence of their movement transversely to the wind, are influenced by a wind direction which is not facing directly in towards the broad surface of the blades. However, there will still arise a wind component which seeks to force the blades rearwards.

The consequence of this related, elastic flexing rearwards by the blades, is that during their movement past the tower, the stronger the wind the closer the outer ends of the blades will come to the tower. Since the windmills shall preferably also be able to function effectively in strong winds, it is thus necessary for the blade rotor, seen in the direction of the mill housing's main shaft, to be positioned so far forwards that the blades, during their rotation, at no time can be exposed to influence by the wind to such a degree that they make contact with the tower with associated risk of serious accidents or direct damage. Various items of security equipment can be used for the braking of the rotor in strong winds, but in such cases it must be taken into consideration that the more the rotor is braked, the more the effective wind pressure against the blades' broad sides is increased to a considerable degree.

The problem could naturally be solved by the blade rotor being positioned at great distance from the mill tower, but for many reasons this is a very expensive solution. Consequently, attention is focused on the stiffness of the blades, precisely so that these can withstand a high wind pressure without the blade hub having to be disposed at some exaggerated distance from the vertical axis of the tower.

The blades are traditionally constructed as aerodynamic shell profile elements with a long, straight main beam extending out along the blade at its thickest area. This main beam is in itself particularly rigid precisely in the direction which is relevant here, which will be in the direction of the beam's height, but on the basis discussed there can be reason to undertake closer considerations with regard to the relevant flexibility of the beam, i.e. with regard to extra stiffening.

Two different methods have hitherto been suggested for the solving of the problem, though without either of these having made the provision that the main beam should be stiffened, i.e. firstly that the blade rotor is placed on a main shaft which slopes slightly upwards, and secondly that the blades are mounted in a forwardly-inclined manner, which solutions can be briefly commented on as follows:

When use is made of an upwardly-sloping main shaft, the whole of the rotor plane is tipped upwards/rearwards, so that in their rotational movement in the space above the tower, the blades can freely swing in over the contour of the underlying tower, while the passage of the blades below will take place at increased distance from the tower. The mill can thus operate with a considerable free distance between the tips of the blades and the side of the tower, even though the blade hub is positioned more or less close to the tower, in that the blades below will thus swing free of the tower even with strong rearwards deflection, while above they will obviously swing free of the tower, even though they are deflected rearwards completely in over it.

With this arrangement, the rotor plane will be inclined in relation to the vertical, and it has been ascertained that merely this condition in itself appears generally unattractive aesthetically, because for an immediate consideration it is rather illogical. It is known that there exists a deep emotional engagement surrounding the sensible utilisation of the wind power, and the condition named here is enough in itself to have a misleading effect on the debate in this field.

The same applies with said second solution outlined above, i.e. where although the blades rotate in the vertical plane, they assume a "cone" formation in the forwards direction, i.e. they are placed in such inclined retaining parts on the blade hub that they will not only be simply "radiating", but each also slightly forwardly inclined, so that in their rotation they described a conical surface. It can also be achieved hereby that the blade hub can be situated at a more or less short distance from the shaft of the mill tower, while the blade tips in a blade rotor rotating in the vertical plane have, however, ample possibilities of being pressed back without hereby colliding with the mill tower. However, this solution is relatively costly, the reason being that it is expensive to arrange the slightly inclined retaining parts on the blade hub, and to which can be added that also the resulting appearance of a conical blade rotor gives rise to objections from the point of view of aesthetical criteria.

While there is a strong case that the invention should be concerned with a further stiffening of the said main beam in order to obtain a picture of a blade rotor rotating in a vertical plane, with the invention there is introduced the modification that the use of said "straight" beams is omitted in the construction of the blades, and use being made instead of "high-edge curving" main beams, without necessarily speculating further concerning the stiffness of these beams.

The blades in themselves will thus be able to appear as a right-angled extension out from the blade hub, which can more or less gradually go over into a curved extension, e.g. merely along the outer third of the blade, so that the blade tips stand at a greater distance from the tower. A rotor with blades shaped in this way has proved not only to be more effective for the considered objective, but also aesthetically acceptable, in that visually the curving outwards manifests itself very little. For example, it will be quite an attractive result if the blade hub can be placed a half a metre closer to the tower shaft, and an associated outwards curvature of a blade with a length in the order of 25 m will be only slightly visible, namely when the inner, thicker length parts can be seen to work in a plane which appears natural to the observer.

Compared to blades with the said negative coning, the blades according to the invention will distinguish themselves partly in that the rotor hub can be built in a conventional manner, and partly that the hub will be not influenced by substantial bending forces originating from the effect of centrifugal force on the blades. With coned blades, a great part of the straightening-out of the blades will be due precisely to the centrifugal force, so that they must be extra coned in order also to accommodate the rearwards deflection which occurs under wind pressure.

Compared with the said tilted rotors, the invention offers the advantage that the blades are influenced in a uniform manner all the way around, in quite the same way as with conventional rotors, while the blades in a tilted rotor are influenced unevenly, i.e. all depending on whether they are moving upwards or downwards, and are consequently herewith moving respectively with and against the wind, which corresponds to a yawing-error which can give rise to various problems.

As mentioned above, it is characteristic of a blade according to the invention that the main beam itself is partly formed with a curvature in the high-edge side, but it must be emphasized, however, that the invention is not limited to this, in that by formation in a suitably shaped mould the blade can be given the desired curvature also with wholly or partly beam-free box constructions.

Figure 2:
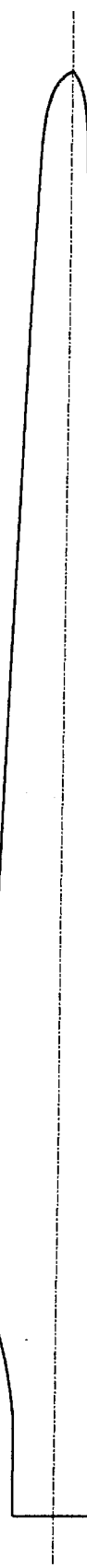
Figure 3:

The invention will now be described in more detail with reference to the drawings, in which FIG. 1 shows a windmill with a blade rotor according to the invention seen from the side, FIG. 2 shows a windmill blade seen from the front, and FIG. 3 shows the blade in FIG. 2 seen from the side edge.

The windmill shown in FIG. 1 consists in the normal manner of a tower 2, a mill housing 4 and a main shaft 6 with rotor hub 8 for blades 10 which constitutes a blade rotor. The mill is a "front-runner", where the rotor turns forwards towards the wind W, which means that the wind pressure will bend the blades backwards and herewith inwards towards the tower 2. Therefore, the system 4,6 must be disposed in such a manner that the necessary safety distance must exist between the blades 10 and the tower.

With the invention, this distance can be minimized by the blades being provided with a forwardly-directed curvature, preferably only over an outer extent 12, whereby the tips of the blades, when at rest, will stand at some distance (a) in front of the plane p which is formed by the blade axes at the root parts of the blades. The blades can hereby be constructed so that also in strong winds they will lie at a safe distance outside the tower, possibly curving slightly rearwards towards.

In FIGS. 2 and 3 is shown an authentic configuration of a windmill blade with a length of 29 m. The outwards curvature of the tip shown in FIG. 3 amounts to approximately 50 cm, but this may well be somewhat larger or somewhat smaller. However, it is preferable that the curvature is not much greater than the radius of the blade root, since this can give rise to certain difficulties in the transport of the blade.

The invention does not prescribe in detail the conditions for how and with what curvature the curvature should be produced, in that this must be determined on a professional level while paying regard to the blade construction in general. Consequently, it shall not be excluded that it can be chosen to place the curvature almost as a bend in the thick end part of the blade, with the outer part of the blade extending straight or slightly curved.

It must be mentioned that in the claims it has been chosen to relate the invention to the said coned rotors as known technique, and that it has hereby been found expedient to refer to the blade axes p as centre of the normally cylindrical-shaped blade root parts where these are secured to the blade hub or at their transition area to the hub.

What is claimed is:

1. A windmill of the front-runner type having a rotor rotatably carried on a windmill tower for rotation about a substantially horizontal axis of rotation and having a plurality of airfoil shaped blades mounted on the rotor with a front side thereof adapted to face away from the tower and counter to a direction of wind travel toward the tower, the airfoil shaped blades projecting radially from the rotor a distance which renders the blades resiliently bendable toward the windmill tower under the action of moderate to strong wind pressure applied to the front side of the blades; wherein said airfoil shaped blades have a rotor-mounted body portion which extends in a plane which is perpendicular to said axis of rotation and have a free tip end portion which has a longitudinal forward curvature relative to said normal plane, said curvature extending along at least an outer one-third of the blade in a longitudinal direction of the blade and being of a magnitude which places a free tip end of each blade completely in front of said normal plane so as to avoid that said resiliently bendable blades contact the windmill tower during strong wind pressure.

2. Windmill according to claim 1, wherein said magnitude of the forward curvature corresponds to a radius of a root part of the blade.

3. A windmill according to claim 1, wherein said curvature commencing at approximately an outer one-third of the blade in a longitudinal direction of the blade from said rotor hub.

4. A rotor for a windmill of the front-runner type, said rotor having a shaft projecting from a rotor hub in a direction of wind travel and adapted for rotatably carrying the rotor directly on a windmill tower for rotation about a substantially horizontal axis of rotation passing through the windmill tower and having a plurality of airfoil shaped blades mounted on the rotor with a front side thereof adapted to face in an opposite direction from said shaft and counter to said direction of wind travel, the airfoil shaped blades projecting radially from the rotor a distance which renders the blades resiliently bendable toward the windmill tower under the action of moderate to strong wind pressure applied to the front side of the blades; wherein said airfoil shaped blades have a rotor-mounted body portion which extends in a plane which is perpendicular to said axis of rotation and have a free tip end portion which has a longitudinal forward curvature relative to said normal plane, said curvature extending along at least an outer one-third of the of the blade in a longitudinal direction of the blade and being of a magnitude which places a free tip end of each blade completely in front of said normal plane so as to avoid that said resiliently bendable blades contact the windmill tower during strong wind pressure.

5. A rotor according to claim 4, wherein said magnitude of the forward curvature corresponds to a radius of a root part of the blade.

6. A rotor according to claim 4, wherein said curvature commencing at approximately an outer one-third of the blade in a longitudinal direction of the blade from said rotor hub.

* * * * *